UNITED STATES PATENT OFFICE.

AUGUST F. W. PARTZ, OF PHILADELPHIA, PENNSYLVANIA.

DEPOLARIZING COMPOUND.

SPECIFICATION forming part of Letters Patent No. 379,180, dated March 6, 1888.

Application filed October 6, 1886. Serial No. 215,481. (No specimens.)

*To all whom it may concern:*

Be it known that I, AUGUST F. W. PARTZ, of Philadelphia, in the county of Philadelphia and State of Pennsylvania, have invented certain Improvements in Depolarizing Compounds, of which the following is a specification.

Heretofore a compound for making "electropoion fluid" has been produced by heating a mixture of about equal parts of water, sulphuric acid, and bichromate of potash till the mass became of sirupy consistence, and then letting it solidify by cooling. Solutions of this product proved to be much less effective depolarizers than similar solutions made directly of the same ingredients, and this I found to be chiefly owing to an abundant and unavoidable escape of oxygen—*i. e.*, reduction of chromic acid to oxide through the heat required for expelling the water toward the end of the operation.

In order to obtain a solid compound without evaporation, and the consequent great loss of oxygen, other chemists managed to dispense with the use of water by heating a mixture of sulphuric acid and sulphate of potash till the salt was dissolved and then adding bichromate of potash. Though this process may be so conducted that the formation of chromic oxide is less considerable than by the process above referred to, this advantage is gained by the introduction of a substance which increases the bulk and cost of the product without adding to its efficiency as a depolarizer.

The object of my invention is to produce a solid compound consisting of chromic acid, sulphuric acid, and so much acid sulphate of potash as will result from the action of sulphuric acid upon bichromate of potash, and being virtually free from chromic oxide.

The success of the process here involved depends on the right proportions of the ingredients, the non-application of heat, and a proper manipulation.

I attain the desired result by operating as follows: Into twelve hundred cubic centimeters of sulphuric acid of about 66° Baumé, contained in a porcelain dish of about four times that capacity, I stir thirteen hundred and fifty grams of bichromate of potash in a powdery state, and to prevent the forming of crusty agglomerations I let the bichromate fall through a screen upon the acid while stirring it in. The intended chemical change takes place with disengagement of heat. As the pulverizing of bichromate of potash and its subsequent handling is a matter of much inconvenience on account of the injurious effect of the dust upon the mucous membranes, I have contrived to avoid the mechanical reduction of the salt and to procure a less dusty material by heating commercial bichromate in an iron vessel just enough to bring it into fusion and then pouring it upon metallic trays or plates, where it forms into crystals which break up into a gritty powder while cooling.

The incorporation of the stated quantities of sulphuric acid and bichromate should be completed in rather less than fifteen minutes, as a continuation of the process after the mass has become well heated by chemical action is apt to cause an emission of oxygen. When the mass has cooled down to a semi-fluid state, it may be cast into molds of suitable material, or it may be left in the porcelain dish and broken up into granular lumps while solidifying. The red amorpho-crystalline product thus obtained consists of chemically-combined chromic and sulphuric acid and of the acid sulphate of potash due to the conversion of the bichromate salt by a portion of the sulphuric acid without containing any appreciable intermixture of chromic oxide.

The product being hygroscopic must be kept in well-closed vessels or in air-tight envelopes of a pliable material which it does not act upon. If it is cast in bars or cakes, I wrap them in paraffined paper or cloth and then dip the parcels into molten paraffine, thus putting the article at a low cost into a suitable commercial form.

When the compound is to be used for a Poggendorff or a Grenet battery, one pound of it may be dissolved in from two and one-half to five pints of water, according to the desired strength of the liquid. When employed in my "acid-gravity battery," it is put undissolved into the glass tubes with which the apparatus is provided.

I do not hold myself strictly to the proportions of sulphuric acid and bichromate of potash above stated, as they may be varied to some extent without the nature of the compound being thereby materially changed, nor do I confine myself strictly to the mode of operating above set forth.

By the expression "without the application of heat," as herein employed, is meant without the application of heat from an external source; or, in other words, without the employment of heat other than that generated by the chemical reactions between the substances employed.

Having thus described my invention, what I claim is—

1. The solid depolarizing compound herein described, consisting of chromic acid, sulphuric acid, and only so much acid sulphate of potash as is due to the action of sulphuric acid upon the bichromate of potash employed, said compound being practically free from chromic oxide.

2. The process of producing a solid depolarizing compound, which consists in decomposing bichromate of potash by sulphuric acid without the aid of water or an alkaline sulphate and without the application of heat.

3. The process of producing a solid depolarizing compound, consisting, first, in reducing the bichromate of potash to a powdery state by fusion and cooling, and then decomposing the powdered mass by sulphuric acid.

4. As a new product, the herein-described solid depolarizing compound resulting from the decomposition of bichromate of potash by sulphuric acid without the aid of water or an alkaline sulphate or applied heat.

In testimony whereof I hereunto set my hand, this 24th day of September, 1886, in the presence of two attesting witnesses.

AUGUST F. W. PARTZ.

Witnesses:
C. A. NEALE,
ANDREW PARKER.